United States Patent

[11] 3,563,511

| [72] | Inventor | Herbert Bentley-Leek<br>Hereford, England |
|---|---|---|
| [21] | Appl. No. | 845,802 |
| [22] | Filed | July 29, 1969 |
| [45] | Patented | Feb. 16, 1971 |
| [73] | Assignee | Saunders Valve Company Limited |
| [32] | Priority | Aug. 7, 1968 |
| [33] | | Great Britain |
| [31] | | 37708/68 |

[54] FLOW CONTROL DEVICES
9 Claims, 7 Drawing Figs.

[52] U.S. Cl. ................................. 251/209,
 251/315
[51] Int. Cl. .................................. F16k 5/12,
 F16k 5/06
[50] Field of Search ........................... 251/209,
 212, 315

[56] References Cited
UNITED STATES PATENTS
| 694,365 | 3/1902 | Garrison ................ | 251/212X |
| 2,449,833 | 9/1948 | Barnes .................. | 251/209 |

*Primary Examiner*—Arnold Rosenthal
*Attorney*—Watson, Cole, Grindle & Watson

ABSTRACT: A plug-cock-type flow control valve wherein one of the ports of the bore of the plug coacts with a member having an aperture which is asymmetrically shaped with respect to the axis of the plug bore, the apertured member being settable in any one of a number of different angular positions relative to the plug bore axis to provide different patterns of development of the effective flow passage through the valve as the plug is rotated between the closed and open positions of the valve.

FLOW CONTROL DEVICES

The present invention concerns plug-cock-type flow control valves and it is the object of the invention to provide such a flow control valve having a flow characteristic which is variable at will.

According to the invention there is provided a plug-cock-type flow control valve wherein one of the ports of the plug bore is arranged to coact with a member having an aperture therein to provide a flow passage through the valve, the aperture in said member being asymmetric with respect to the axis of the plug bore in the fully open position of the valve and the member being selectively disposable in any one of a number of different angular positions about said axis to provide any one of a number of different flow characteristics for said flow passage.

The various features and advantages of the invention will be apparent from the following description of some exemplary embodiments illustrated in the accompanying drawings of which:

Figure 1:
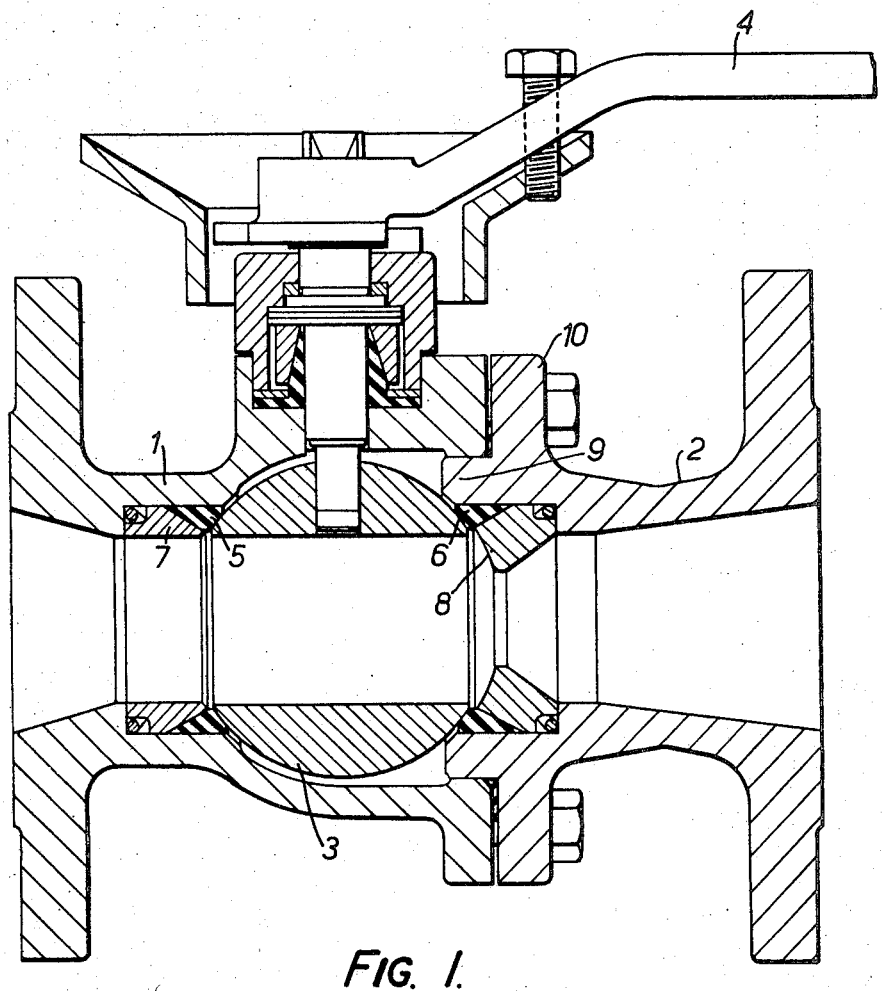
FIGS. 1 and 2 are respectively a longitudinal section and a plan view of one form of spherical plug-cock-type type valve embodying the invention.
Figure 4:
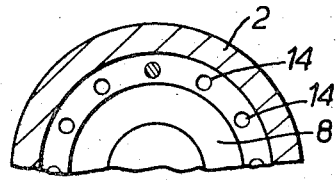
Figure 5:
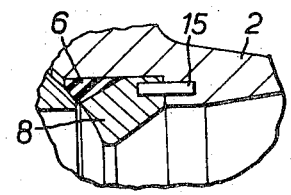
Figure 6:
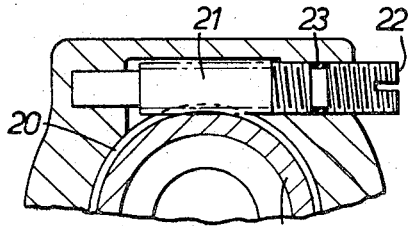
Figure 7:
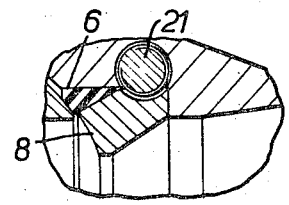

FIGS. 4 and 5 are sections at right angles of a detail of the valve of FIG. 1; and FIGS. 6 and 7 are views similar to those of FIG. 4 and 5 of a modified form of the valve of FIG. 1.

Figure 2:
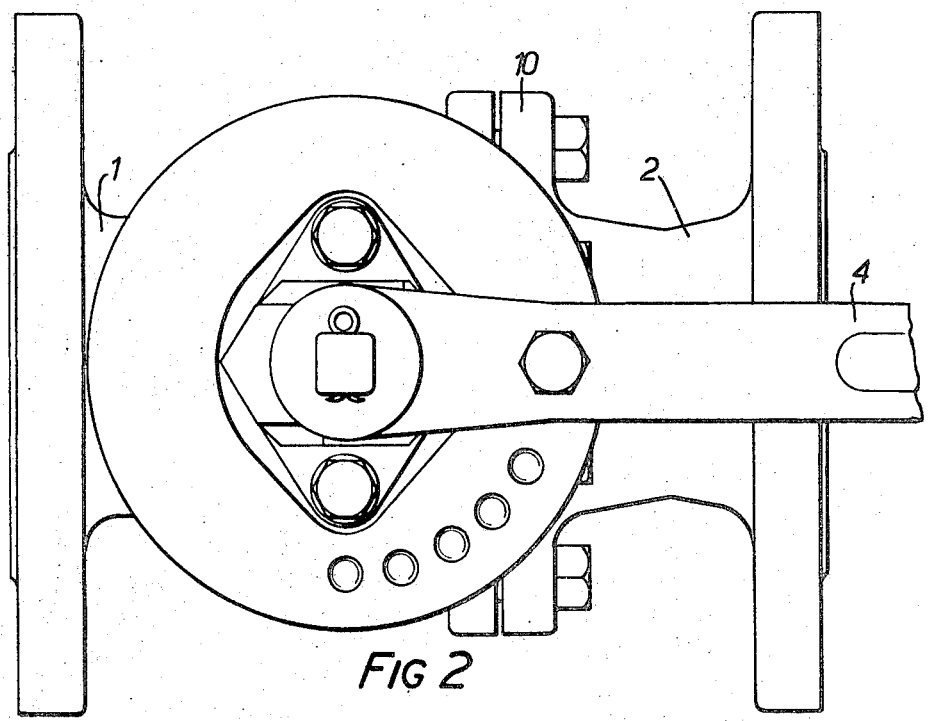

Referring to FIGS. 1 and 2 the valve there shown is largely of conventional form comprising a casing of which the main body 1 has secured to it by four bolts an end connection 2 and houses a spherical plug 3 which is rotatable by a control handle 4 from the fully open position shown through 90° to the fully closed position in which the plug provides no connection between the bores in the main body 1 and end connection 2. The plug rotates between a pair of seating rings 5 and 6 secured in the main body and end connection respectively by respective thrust rings 7 and 8. The inner end of the end connection 2 has an annular projection 9 extending beyond the end face of its fixing flange 10 which fits into the bore in the end face of the body 1 and the four bolt holes in the flange 10 are spaced 90° apart so that the end connection 2 can be bolted to the casing body 1 with any one of four different angular orientations.

Figure 3:
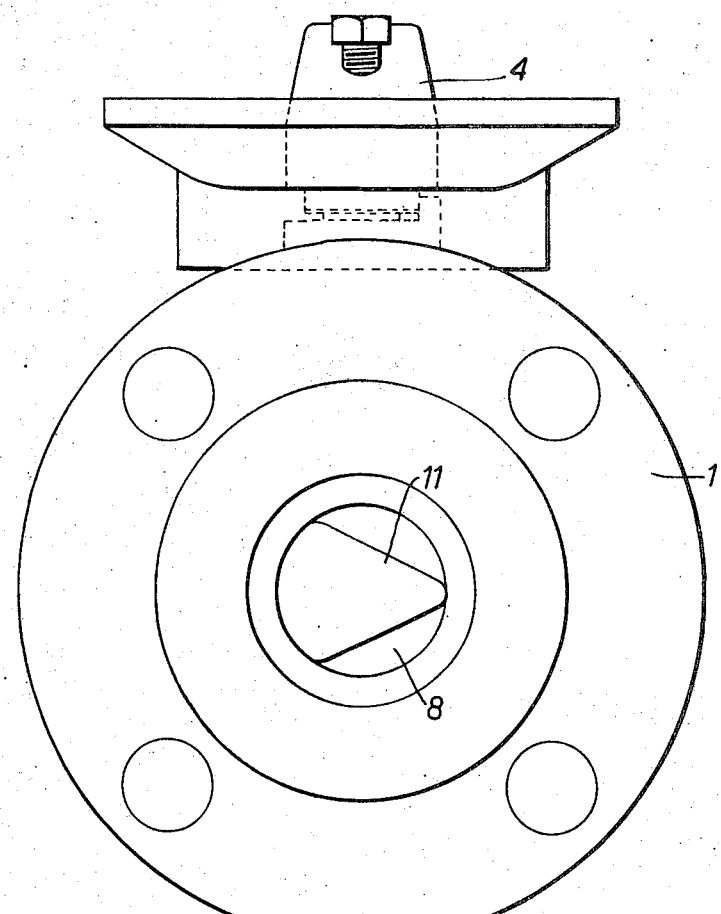
FIG. 3 is an end view from the left-hand end of FIG. 1 with the valve in fully open state.

The thrust ring 8 has an orifice 11 which, in the embodiment shown, is of generally triangular shape (see FIG. 3) but which can be of any other desired shape which is asymmetric with respect to the center of the ring, depending upon the particular flow characteristics it is desired to obtain from the valve.

It will be appreciated that the asymmetric orifice 11 will coact with a circular port in the plug 3 in a different manner in each of the four different orientations of the end connection 2 which are possible with the four bolt holes in the flange 10, so that by selecting the appropriate orientation before the end connection and main casing body are bolted together, any one of four different flow characteristics can be obtained from one valve. This is the case where the thrust ring is secured to the end connection 2 so as to be nonrotatable with respect to such connection and also in the case where the end connection itself is arranged to provide the asymmetric orifice instead of the latter being formed in the thrust ring.

For a larger number of different flow characteristics the thrust ring 8 carrying the asymmetric orifice 11 may be provided with a series of holes 14 as shown in FIG. 4 and be secured in any selected one of a number of angular orientations with respect to the end connection 2 by means of a dowel 15 (FIG. 5) projecting from the seating for thrust ring 8 in connection 2, and fitting into one of the holes 14. FIGS. 4 and 5 show such an arrangement providing twelve different angular settings of the thrust ring 8.

For an infinitely variable control of flow characteristic the modification shown in FIGS. 6 and 7 may be used. In this modification the outer periphery 20 of the ring 8 carrying the asymmetric orifice 11 is toothed to cooperate with a worm 21 which can be rotated from outside the casing by engagement of a tool in the slotted end 22 of the worm.

To prevent escape of fluid through the engaging teeth of the ring and worm and along the worm shaft the latter is sealed in the bore in which it rotates by means of an O-ring 23.

In all three embodiments above described only the orifice 11 in the thrust ring 8 or in the end connection 2 is assumed to be noncircular, the port in the plug 3 being assumed to be circular. It will however be appreciated that with both the port and orifice of noncircular form, a wider range of variations in flow characteristic can be obtained.

By suitable selection of the shape and size of the plug ports, of the orifice 11, and of the contour of the thrust ring, various flow characteristics can be achieved and in particular a smooth characteristic rendering the valve suitable as a regulating valve can be obtained.

I claim:

1. A plug-cock-type flow control valve comprising a casing having inlet and outlet ports and a plug also having inlet and outlet ports and being rotatably mounted in said casing so as to be rotatable between a first position in which said plug ports are in communication with said casing ports to provide a flow passage through said valve and a second position in which said plug ports are out of communication with said casing ports and said plug prevents flow between said casing inlet and outlet ports, wherein said valve includes an apertured member selectively disposable with respect to said casing in any one of a number of different angular positions about an axis extending through said plug ports in said first position of said plug and having an aperture therein the shape of which is asymmetric with respect to such axis so that said aperture coacts with one of said plug ports during rotation of said plug in a different manner in at least two of said different angular positions whereby to provide different flow characteristics for the flow passage of the valve in such different angular positions.

2. A valve according to claim 1 wherein said apertured member is disposable in selected angular position during assembly of the valve and remains fixed once the valve has been assembled.

3. A valve according to claim 1 wherein said apertured member is selectively disposable in any one of a number of equally angularly spaced positions.

4. A valve according to claim 1 wherein the casing of the valve comprises a main body part housing said plug and an end connection part detachably secured to said main body part by means serving to determine the orientation of said aperture about said axis.

5. A valve according to claim 4 wherein said end connection part constitutes said apertured member.

6. A valve according to claim 4 wherein said end connection part is detachably secured to said main body part by bolts engaging in registering holes in said end connection part and main body part.

7. A valve according to claim 1 wherein the casing of the valve comprises a main body part housing said plug and an end connection part detachably secured to said main body part and in that said apertured member is constituted by a thrust ring arranged to be urged towards said plug by said end connection part to urge a seating ring interposed between said thrust ring and said plug into sealing engagement with said plug.

8. A valve according to claim 7 wherein said thrust ring is secured to said end connection part.

9. A valve according to claim 7 wherein the outer periphery of said thrust ring is toothed and a drive worm operable from outside said casing engages the toothed periphery of said thrust ring whereby the angular position of said thrust ring may be varied by operating said worm.